Oct. 19, 1954　　　W. H. DUERIG　　　2,691,839

FISH LURE

Filed Nov. 17, 1950

INVENTOR.
WILLIAM H. DUERIG
BY Jnoshacey
ATTORNEY

Patented Oct. 19, 1954

2,691,839

UNITED STATES PATENT OFFICE 2,691,839

FISH LURE

William H. Duerig, Silver Spring, Md.

Application November 17, 1950, Serial No. 196,231

4 Claims. (Cl. 43—17.6)

1

The present invention relates to an improved fish lure of the type intended to float upon the surface of the water.

Floating lures generally are attractive to the fish because of their appearance or the sound they make, or both, and/or the commotion and surface disturbance, that is, sight perception of bubbles and waves created. Since, except in very clear water, the vision of fish is in general poor, they will not be able to see a lure unless it produces a high enough intensity of light to be seen. Moreover, this light should be in a color band which is found to be most attractive to the fish.

Some lures in use up to the present time function to make light visible to the sight of fish by reflected and scattered light. Others employ the principle of light retentivity by using luminous material inserted in the body of the lure or luminous paint on the exterior of the lure.

One of the more important objects of the present invention is to provide an improved floating lure which will convert direct or indirect sunlight into one or more color bands and emit these colors below the water surface directly to the eyes of the fish.

Another object is to provide an improved fish lure which will transmit fish attracting colors directly to fish below the surface of the water.

A further object of the invention is to provide a lure which, because it transmits colors directly rather than by reflection, can be seen from far greater distances under water than ordinary lures, with the result that it will be highly effective for attracting fish.

And a further object is to provide a lure which will be characterized by its extreme simplicity.

Other objects of the invention will appear as the description proceeds.

2

The lure of the present invention converts sunlight (either direct or indirect, since areas even dimly shaded from the sun have a high ultraviolet content) into one or more color bands and emits these colors below the surface of the water directly to the eyes of the fish. No light loss is met with, as is the case with ordinary lures where reflection is required. Thus, light in one or more color bands is converted and emitted, not reflected, with extremely great brightness, to fish swimming below the surface of the water. Since the colors selected, e. g., orange, yellow, etc., are highly attractive to the fish, the lure of the present invention will be much more effective in attracting fish because it can be seen for far greater distances under water than lures of the ordinary type. Moreover, because of this principle of direct lighting, color conversion and under water emission, the invention is effective for night fishing, if moonlight or other surface illumination is present.

Figures 5, 7:
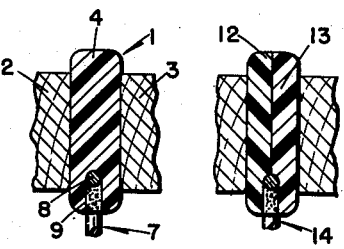
Fig. 5 is a detail section, on the line 5—5 of Fig. 2.
Fig. 7 is a detail section showing a modified light transmitting element.

Referring now to the drawings in more detail, my improved lure includes a body 1 which is of generally elliptical shape, being tapered toward one end. The body 1 consists of two companion sections 2 and 3 which have flat opposed inner faces cemented or otherwise secured to the opposite sides of a light converting and emitting element 4. The sections 2 and 3 are made of wood, hollow plastic or other suitable buoyant material, while the element 4 is formed of a fluorescent plastic material such as "Plexiglas." As will be seen from a scrutiny of the drawings, the element 4 extends longitudinally of the body from top to bottom thereof and is shaped generally to conform to the outline of the sections 2 and 3 but has upper and lower marginal portions 5 and 6 extending, respectively, above and below the upper and lower surfaces of the said companion body sections 2 and 3. As will be understood, the element 4 may consist of a single sheet of fluorescent "Plexiglas," or, as best seen in Fig. 7, it may be constituted by a plurality of "Plexiglas" sheets, each of a different color, cemented together, depending upon how many bands of colored light are to be emitted beneath the water's surface. By "bands of colored light" is meant that the light impinging on the Plexiglas element 4, say sunlight, is made up of nearly all wavelengths of the visible and near ultraviolet portions of the spectrum, i. e. it is "white light." The plastic element converts this light to light which is made up of wavelengths lying in a restricted portion of the spectrum, that is, it is a band of light which appears to be of a certain color to the eye.

A hook 7 has its shank 8 secured in a groove 9 formed in the undersurface of the element 4 and depends from one edge thereof, the plane of the hook being coincidental with the central longitudinal plane of the element. The hook 7 has an eye 10 at one end and a barb 11 at the other end.

In the modification of Fig. 7, the lower end portions of the sheets of fluorescent plastic, shown at 12 and 13, are formed with mating grooves to receive and anchor the shank of a hook 14 which is similar to the hook 7.

Figure 1:
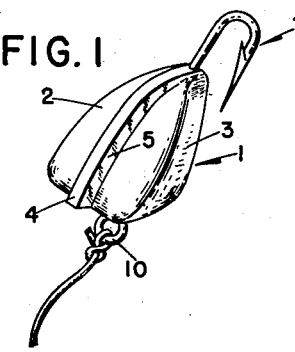
Fig. 1 is a perspective view of the improved lure.
Figure 2:
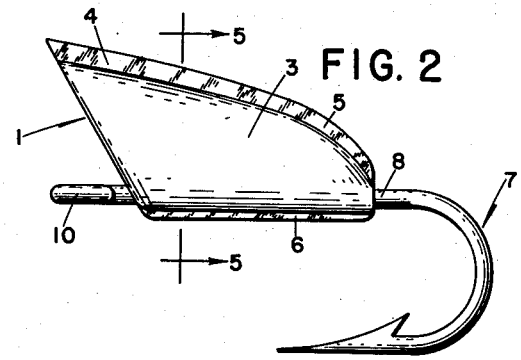
Fig. 2 is a side elevation thereof.
Figure 4:
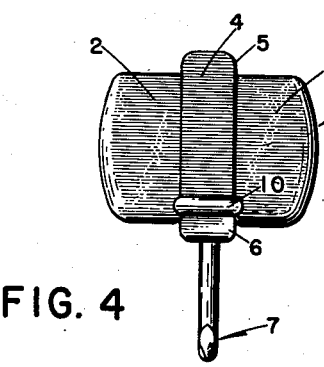
Fig. 4 is a rear view of the invention.
Figure 3:
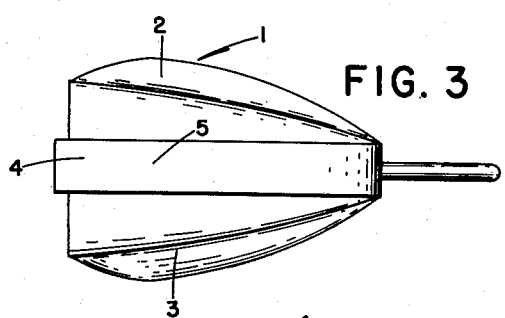
Fig. 3 is a plan view of the invention.
Figure 6:
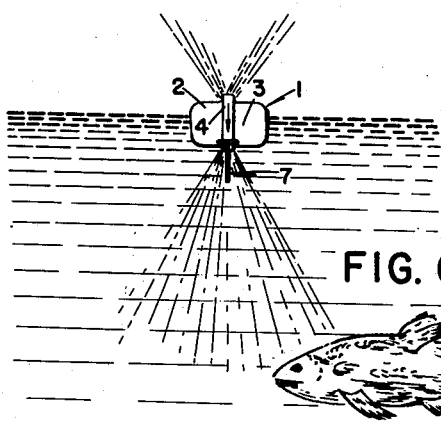
Fig. 6 is a perspective view of the lure in the water, and particularly showing how it converts light and emits it directly to the eyes of a fish swimming below the surface.

In use, when the lure is floating in the water, as shown in Fig. 6, light rays will strike the flat upper surface of the element 4 and, because of the characteristics of the fluorescent plastic of which said element is made, will be converted into a band of colored light and this light emitted through the water to the eyes of fish swimming below the surface, with the result that they will be attracted to the hook 7. The color of the band of light may be orange, yellow or some other bright color which will be most likely to penetrate beneath the surface of the water and attract the fish.

As previously pointed out, in the modification of Fig. 7, the color converting and emitting element consists of two sheets of fluorescent plastic cemented together, which said sheets may be of contrasting colors, for emitting different bands of colors which will be highly attractive to the fish.

Figure 8:
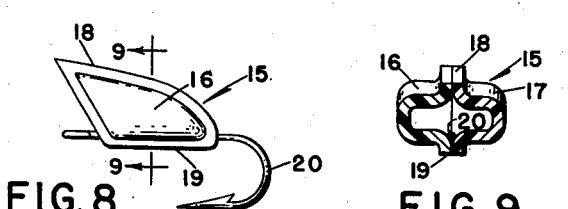
Fig. 8 is a side elevation showing another modification.
Figure 9:
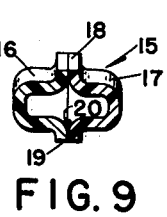
Fig. 9 is a section on the line 9—9 of Fig. 8.

In the modification shown in Figs. 8 and 9, the body of the lure is shown at 15 and is constituted by a pair of generally cup-like mating sections 16 and 17 which are formed entirely of fluorescent plastic and which define a hollow central chamber, for providing buoyancy. The sections 16 and 17 are cemented together at their margins so that the body will be water-tight. Flat upper and lower surfaces 18 and 19 are provided for the sections and these surfaces define "lenses" for emitting light rays beneath the surface of the water. That is, light rays strike the upper surfaces 18 and, because of the well known characteristics of fluorescent plastic of which the entire body 15 is made, will be projected from the lower surfaces 19. A hook 20, similar to the hooks 7 and 14, is provided for the lure of this modification.

I claim:
1. A fish lure including a body comprising companion sections, a light converting and emitting element between the sections and extending from the top of the lure to the bottom thereof, said element converting uncolored light impinging on the top of the lure into colored light emitted below the lure for attracting fish, and a hook depending from the element, the plane of the hook being coincidental with the central longitudinal plane of the element.

2. A fish lure as recited in claim 1, wherein said light converting and emitting element is formed of fluorescent plastic.

3. A fish lure including a body comprising companion sections, a light converting and emitting element between the sections and extending from the top of the lure to the bottom thereof, said element converting uncolored light impinging on the top of the lure into colored light emitted below the lure for attracting fish, and a hook depending from one edge of the element.

4. A fish lure including a body comprising companion sections, a light converting and emitting element between the sections and extending from the top of the lure to the bottom thereof, said element converting uncolored light impinging on the top of the lure into colored light emitted below the lure for attracting fish, and a hook depending from one edge of the element, said hook having a shank embedded in the element.

References Cited in the file of this patent

UNITED STATES PATENTS

| Number | Name | Date |
| --- | --- | --- |
| 2,121,114 | Beck | June 21, 1938 |
| 2,485,087 | Diamond | Oct. 18, 1949 |
| 2,528,083 | Ruff | Oct. 31, 1950 |

OTHER REFERENCES

Design and Fabrication 43 Circular, published by Plastics Dept. of Rohm and Haas Co., Washington Sq., Philadelphia 5, Pa., March 1950.

101 Useful Luminescent Applications, published by The New Jersey Zinc Co., 160 Front St., New York 7, N. Y. Copyright 1947.

1947 Modern Plastics Encyclopedia, pages 203 to 206, inclusive, published by Plastics Catalogues Corp., 122 E. 42nd St., New York, N. Y.